United States Patent [19]

Weaks

[11] 4,068,931

[45] Jan. 17, 1978

[54] REFLECTOR INCLUDING LIGHT FILTER FOR PHOTOGRAPHIC USE

[76] Inventor: Bill S. Weaks, 510 S. Broadway, Plainview, Tex. 79072

[21] Appl. No.: 729,869

[22] Filed: Oct. 5, 1976

[51] Int. Cl.² .................... G02B 7/00; F21V 11/16; F21V 9/08
[52] U.S. Cl. ...................... 350/318; 362/343
[58] Field of Search ............ 350/318, 319, 156; 240/46.53, 46.59, 46.45, 9.5

[56] References Cited

U.S. PATENT DOCUMENTS

| 1,891,846 | 12/1932 | Stauber | 240/46.53 |
|---|---|---|---|
| 2,018,963 | 10/1935 | Land | 350/156 |
| 2,785,291 | 3/1957 | Bernstein | 350/318 |
| 3,300,637 | 1/1967 | Martland | 240/46.59 |
| 3,369,117 | 2/1968 | Nicolosi | 240/46.53 |

FOREIGN PATENT DOCUMENTS 598,014   2/1948   United Kingdom ............ 350/318

*Primary Examiner*—Jon W. Henry
*Attorney, Agent, or Firm*—Cushman, Darby & Cushman

[57] ABSTRACT

A filter supporting structure fitted to a reflector and light source for use in photography is shown for positioning the filter medium between the light source for illuminating an object to be photographed and the object itself. The support holds the filter in position before the light source and a reflector associated with the source in a position to permit all of the desired light rays to pass on to the object while the filter is carried in a holder in a position to be spaced apart from the reflector structure so that cooling air can circulate freely around the light source.

6 Claims, 4 Drawing Figures

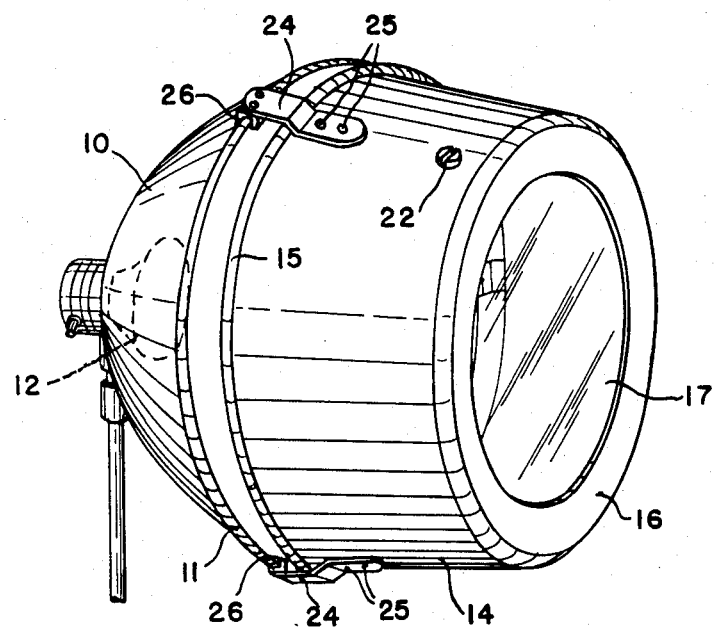
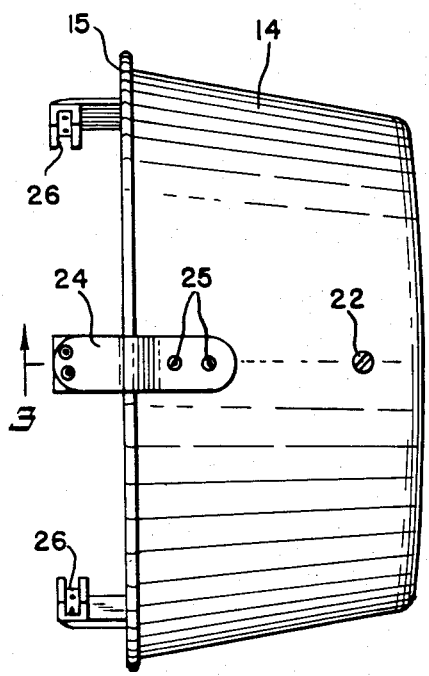
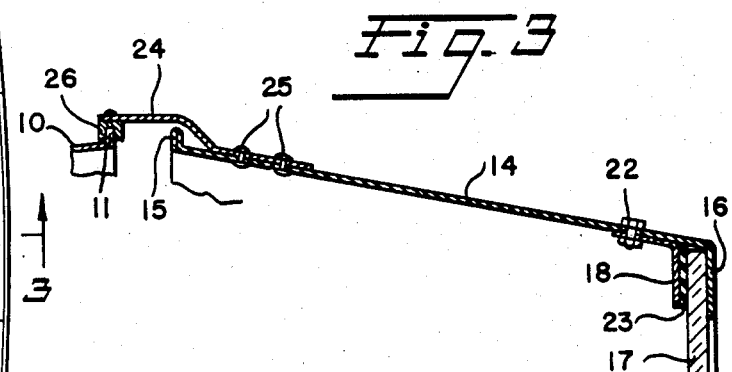
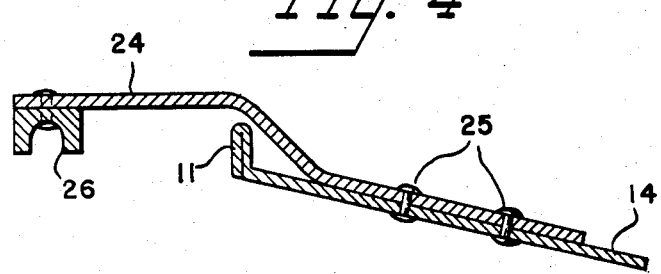

REFLECTOR INCLUDING LIGHT FILTER FOR PHOTOGRAPHIC USE

BACKGROUND

Light structures for photographic studios and sometimes to assist in outdoor photography are well known. Various light sources have been used, and most commonly a conventional incandescent light bulb structure has been mounted in a reflector to illuminate an object to be photographed frequently in combination with a filter. Flash bulbs and other artificial sources of light are known, but the present invention is concerned primarily with the use of filters in connection with artificial sources of lights carried within generally bowl-shaped reflector means frequently found in studio equipment, where the use of a filter over the reflector results in the entrapment of heat resulting from the production of the desired light rays, especially with the use of the higher powered incandescent lamps. The undue buildup of heat in a reflector light source makes the use of plastic-supported filter means impractical and also causes an undue shortening of the life of the bulb to occur.

Known light sources and filter structures for use with such artificial sources of light are illustrated in the following U.S. Pat. Nos. 2,018,963 shows the typical arrangements for use of polarized light filters for which this invention finds particular use. No support means or discussion of the heat buildup problem or its solution is shown in this patent.

2,810,324 discloses a typical mount for a filter means on a reflector and lamp combination. No heat elimination or discussion of air circulation over the source of light is discussed.

1,871,648, 2,747,076 and 2,785,291 all disclose mounting means for carrying signs or protective devices or the like on light sources, however, none addresses itself to the heat and life of the light source problem.

As is well known, incandescent lamps, as well as other types of light sources, such as electronic flashers, that are sometimes confined within a reflector body, produce considerable heat which, if not dissipated properly, causes the light source device to burn out in a very short time. In order to operate the light source under conditions that will result in a reasonable life expectancy for the device, it is essential that good ventilation be provided within the reflector body to prevent a heat buildup. When, however, filters are used over a flared reflector, air circulation is cut off, as with certain of the structures shown in the listed patents.

The present invention provides a cure to the heat buildup problem associated with the use of known reflector structures.

BRIEF DESCRIPTION

The structure of the support for the light filter (polarizing or color) of this invention includes a cylindrical hood having an inlet opening in its base and an exit opening at one end to pass a light beam to the object to be photographed. The filter hood acts like a funnel to collect the light beam and serves to concentrate the light for projection toward the object. The filter support is adapted to be mounted on the reflector device by means of suitable posts provided to hold the filter hood and reflector for the light source in a fixed spaced apart relation.

The reflector itself is usually a flaring bowl-shaped element, and the filter hood is adapted to be attached to the rim of the bowl by a plurality of post elements that are designed to be easily snap-fitted onto the rim of the reflector means. The post supports may be made integral with the filter support hood and are designed to be of a length to provide an opening all around the circular periphery of the reflector between the edge of the reflector body and the hood of the filter support, so that air may circulate freely from outside the reflector over the light source and escape from the confines of the space between the reflector and the filter support hood. This spaced structure effects air circulation for proper cooling of the light source and thus prolongs the life thereof.

IN THE DRAWINGS

FIG. 1 is a perspective view of the assembly of my invention supported in place on a flared reflector body;

FIG. 2 is a side elevation of the filter support hood;

FIG. 3 is a sectional view taken on line 3—3 of FIG. 2; and

FIG. 4 is an enlarged sectional detail of the clip for mounting the filter support hood on the rim of the reflector body.

DETAILED DESCRIPTION

A typical reflector with which this invention is to be used includes a generally flared or bowl-shaped body 10 having a rim 11 and an incandescent light source 12 centered in the bottom of the bowl. The light-producing means is usually an incandescent bulb 13 having a resistance filament supported in the glass envelope to produce the desired light, but electronic light flashers coordinated with the action of the camera are also frequently used. The inner wall of the reflector body is polished to provide a reflecting surface for directing the light rays emanating from the source toward the object to be photographed.

For the taking of certain types of pictures, such as glassware and other smooth surfaces, of water, glossy photographs being duplicated, even some rough textured surfaces, it is necessary to control reflections and flare. In this invention, a glass polarizing filter can be supported in front of the light source in the hood provided as here taught and a suitably turned polarizing light filter can be mounted on the camera lens for making such photographs and for use wherever a polarized light source can be used.

The filter support for the glass polarizing filter or other filter made as here taught includes a hood 14 which has any of various shapes (e.g., right cylindrical, conical, square, oblong or rectangular) to fit a reflector and to hold a filter in position to act on the beam of light projected from a correspondingly-shaped reflector means. The open bottom of the hood constitutes an inlet 15, surrounded by a lip, for light to enter, and the smaller end has a periphery defined by a flange 16 that surrounds the outlet end. A glass support 17 for the filter light polarizing means covers the outlet end of the hood through which light passes to shine on the object being photographed. The hood is provided with a plurality of removable filter support clips 18 spaced around the inner periphery of the hood, the glass plate 17 being adapted to be fitted into the hood to seat against the inside surface of flange 16 to cover the exit opening. The clips 18 may be simple angle iron clips held in place by stove bolts 22 and soft foamed resin or rubberlike backup pads 23 bear against the filter to hold it in place in the hood.

The inlet end of the hood preferably has a dimension about equal to that of the rim 11 of the reflector bowl. The hood is supported from this rim by a plurality of posts 24 spaced around the periphery of the inlet to the hood. The posts may be fixed permanently to the hood at one end by rivets 25, but are provided with C-shaped clips 26 at their free ends. The posts are preferably made of a spring metal and have a shape to permit clips 26 to have a resilient snap engagement over the rim 11 of the reflector body. The posts 24 are designed to be of a length to hold the inlet end of the filter hood spaced from the edge of rim 11 to permit a free circulation of air to take place, and it is suggested that the inlet 15 be spaced away from rim 11 a distance of at least one inch to permit effective air circulation over the light source to take place.

The structure here shown is especially suggested for use with glass-supported polarizing filter means for the light beam passing through the filter. The conical inside wall surface of the filter hood is polished to direct the light from the reflector onwardly through the filter. The reflector and filter hood serve to project a light beam through the polarizing filter onto the object to be photographed with the utmost efficiency of light transmittal. Further, the light source is continuously cooled by the air flow through the opening provided between the reflector edge 11 and hood inlet 15. The rapid removal of the heated air flowing out the slot at the top and easy flow of cool air into the reflector through the slot at the bottom and sides of the reflector bowl allows the light source to operate under the best conditions for realizing its full life.

Where incandescent lamps and reflectors are used principally for studio lighting, the lights must necessarily be left turned on for relatively long periods of time. Such continued illumination is needed to permit the photographer to adjust the position of the lights relative to the subject, study the lighting effects and arrange the subject in the proper position to obtain the most effective lighting. During the time required for such manipulation of the lighting means, which usually includes multiple light sources requiring separate and critical adjustments to satisfy the critical eye of artistic operators, it is essential that the light source be protected as here described to give the light source the best conditions for efficient operation with an expectation of a reasonable service life.

It will be noted that the bodies of the reflector and hood both slope toward the open space provided between the rim of the reflector and the inlet to the hood, so that air flowing into the enclosed space may flow in a streamlined direction into the area where the light source and the glass filter support are confined.

The air is directed by the upwardly sloping reflector wall and hood surface to flow over the reflecting surfaces of both the reflector body and the filter support hood to cool the light source and the glass filter support and then pass upwardly and out the vent opening. The structure of the hood combines with the flared shape of the reflector, in most positions of the spotlight arrangement, to effect a continuous flow of cooling air over the light source and glass filter support. As pointed out above, such cooling is essential to prolong the life of the light source as long as possible, and incidently, permits the glass support to be used whereby the polarizing filter means has a much longer life than the conventional plastic-supported light polarizing filter means.

While the above describes the preferred form of this invention, it is possible that modifications thereof will occur to those skilled in the art that will fall within the scope of the following claims.

What is claimed is:

1. A hood for carrying a light filter for use in photography wherein a source of light is contained within a reflector body to produce light rays that are formed into a beam issuing from a source of light supported in the reflector body and the filter is interposed between the light source and the object being exposed to the reflected rays, comprising a concave reflector body defined by a flaring reflector wall having an edge forming an outlet, the wall being adapted to collect said rays issuing from said source and project a beam of light through said outlet; a hood having an enclosing wall which defines an inlet and outlet opening, said outlet opening being defined by an inwardly projecting peripheral flange on one end of said hood; a filter plate disposed within said hood, a circumferential portion of one side of the plate being in engagement with said flange; means carried by said hood interiorly thereof for engaging the periphery of the other side of said plate and thereby holding said plate against said flange; a plurality of post means carried by said hood near said inlet opening, said post means holding the hood in a position before said reflector to direct said beam toward the outlet end of said hood and to maintain the inlet end of said hood spaced from the outlet edge of said reflector so that air may circulate into the reflector.

2. A structure as in claim 1 wherein said means for holding said plate against said flange includes at least one angle clip having two arms and means releasably securing one of the arms to said hood.

3. A structure as in claim 2 wherein said securing means is a fastener extending through said arm and through the adjacent portion of the wall of said hood.

4. A structure as in claim 1 wherein the inlet end of said hood has a peripheral outwardly extending lip and wherein said posts overlie said lip, the posts being constructed of a spring metal and being secured at one end to the exterior of the wall of the hood and having opposite ends forming clips which are releasably connected to said reflector edge.

5. A hood for supporting a light filter in front of a concave reflector body, said hood comprising a continuous side wall forming an inlet end and an outlet end disposed on a common axis, said outlet end terminating in a peripheral flanges which is integral with said side wall and which projects toward said axis; a filter plate disposed within said hood and having a circumferential portion of one of its sides in engagement with said flange; a plurality of circumferentially spaced apart angle clips releasably secured to the inner surface of said side wall adjacent said flange and engaging the other side of said filter plate to thereby hold said filter plate against said flange; and a plurality of circumferentially spaced apart posts carried by said side wall adjacent said inlet end, each of said posts being constructed of a spring metal and extending away from said inner end of said hood in the direction of sid axis and each of said posts terminating in a C-shaped clip which can be snapped over the edge of a reflector body.

6. A hood as in claim 5 wherein each of said posts includes a strip having opposite end portions lying in spaced apart parallel planes, one of said end portions engaging and being attached to said hood side wall and the other end portion carrying said C-shaped clip.

* * * * *